UNITED STATES PATENT OFFICE.

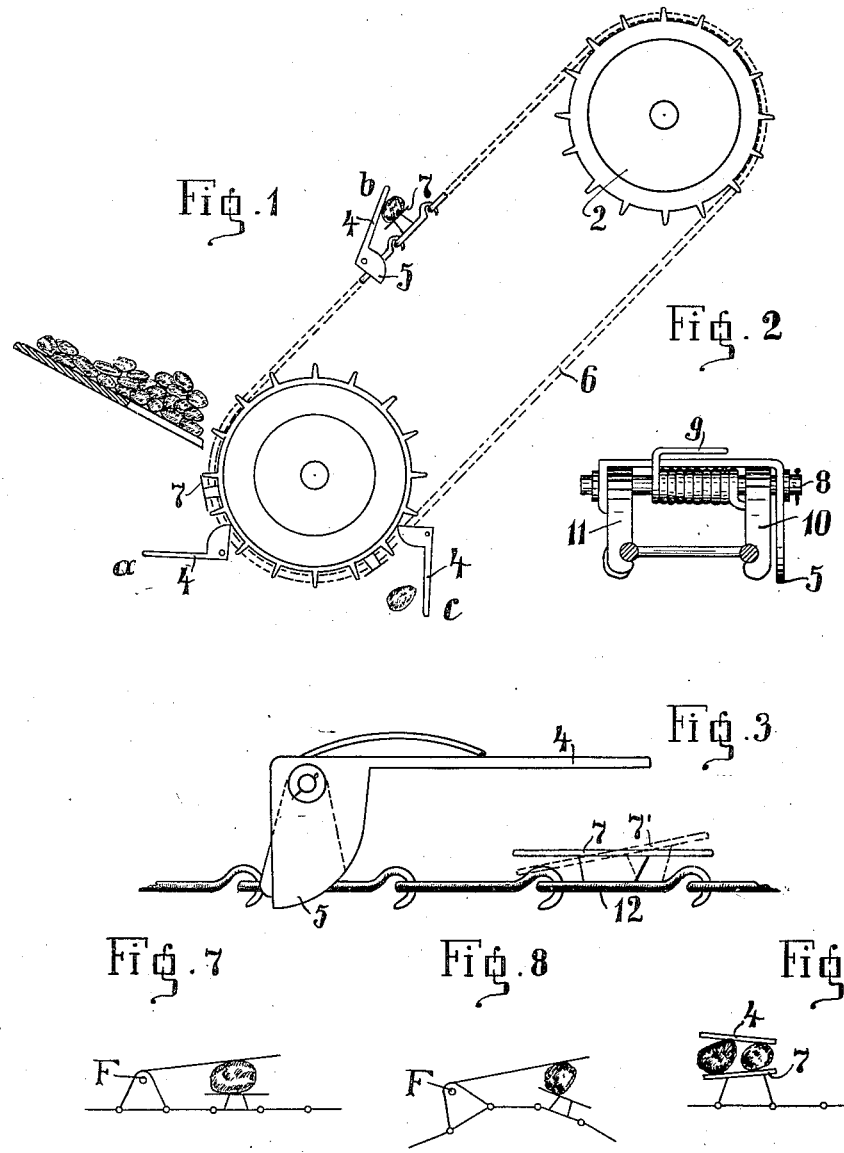

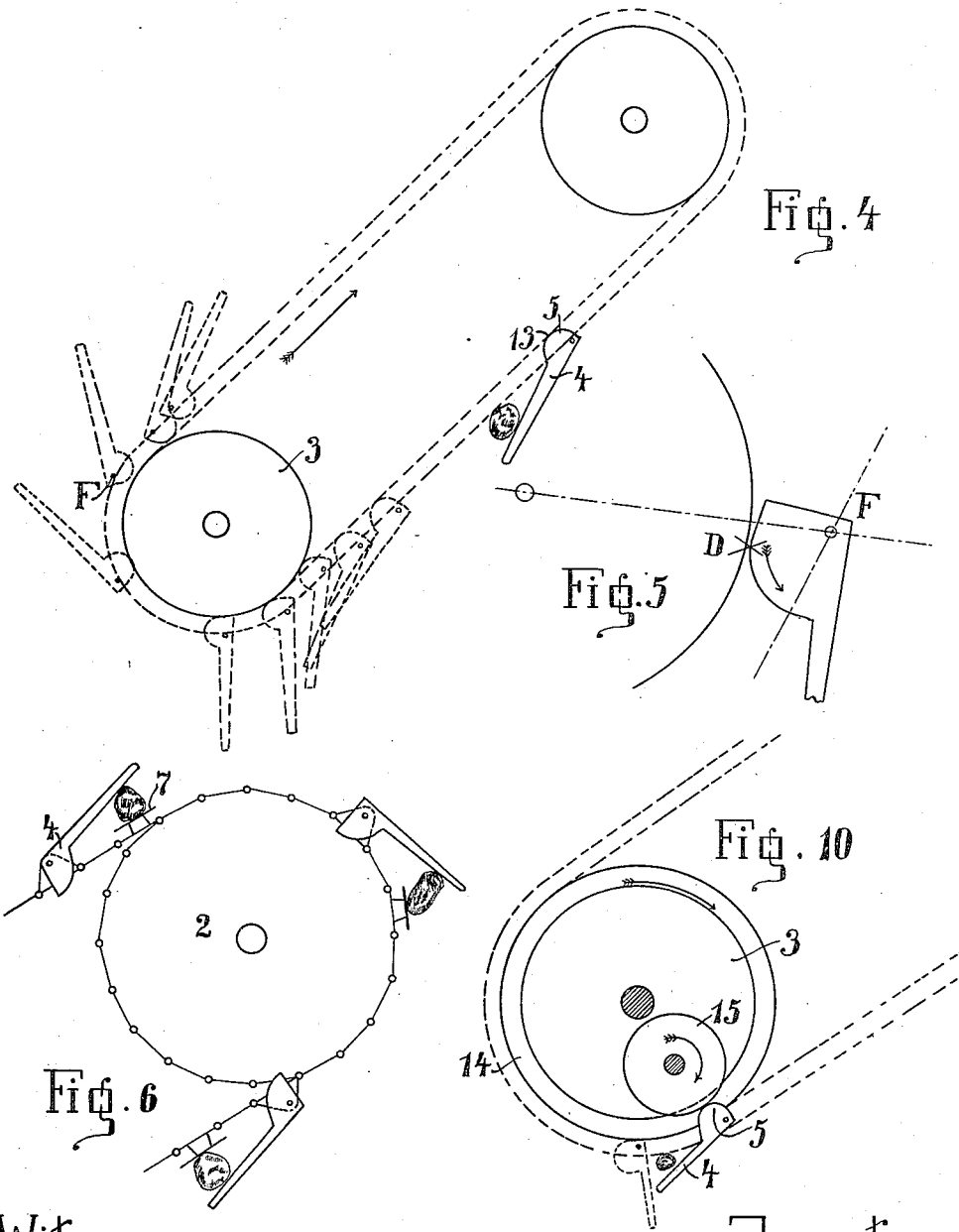

BOHUMIL JIROTKA, OF BERLIN, GERMANY.

FEED MECHANISM FOR POTATO-PLANTERS.

1,139,292. Specification of Letters Patent. Patented May 11, 1915.

Application filed May 23, 1914. Serial No. 840,443.

*To all whom it may concern:*

Be it known that I, BOHUMIL JIROTKA, a subject of the Emperor of Austria-Hungary, residing at Berlin, in the Kingdom of Prussia, German Empire, have invented certain new and useful Improvements in Feed Mechanism for Potato-Planters; and I do hereby declare the following to be a full, clear, and exact description of the invention, such as will enable others skilled in the art to which it appertains to make and use the same.

My invention relates to feed-mechanism for potato-planters, and a primary object is to provide an improved device for controlling the grippers which run over two sprocket-wheels by means of a circular controlling disk or cam against whose periphery the grippers run. According to the invention the grippers are formed in such manner that when passing a sprocket-wheel they roll the potatoes between themselves and a small table or support, whereby when several potatoes are seized simultaneously the smaller are rejected.

In a preferred form of the invention I arrange a controlling disk or cam which rotates on a sprocket-wheel eccentrically within the rim of the latter in the same direction but at a considerably greater speed, by which the grippers are opened.

The invention consists in the construction, arrangement and combination of parts described hereinafter and pointed out in the claims.

One illustrative embodiment of the invention and modifications thereof are represented by way of example in the accompanying drawings, wherein:—

Figure 1 is a side elevation showing the general arrangement of my improved potato-planter feed mechanism, Fig. 2 is a transverse section through the endless conveyor chain on an enlarged scale, and Fig. 3 is a side elevation of part of the chain; Fig. 4 illustrates the seizing and releasing of a potato, and Fig. 5 is a diagram relating to the operations illustrated in Fig. 4; Figs. 6 to 8 are diagrams showing the movements of a gripper on the upper or sorting wheel, Fig. 9 is a front elevation of the gripper, and Fig. 10 a side elevation showing part of a modified form comprising a rotating eccentrically mounted controlling disk or cam for the grippers.

Referring to the drawing, the lower of the two sprocket-wheels 1 and 2 carrying the endless chain 6 is provided with the steering disk 3 which opens and closes the grippers 4 as they travel with the chain. The sprocket-wheel 2 will be termed the sorting wheel because that operation takes place on it by which superfluous potatoes carried by the chain are rejected. The spring-influenced grippers 4 which are opened (position a), closed (position b) and opened again (position c) by their shoulders or projections 5 running onto the steering disk 3 are spring-influenced and are rotatably mounted on the endless conveyer chain 6. They seize the potatoes by pressing them against small tables or supports 7. This operation will now be more particularly explained with reference to Figs. 4 and 5.

In the embodiment shown in Figs. 1 to 4 the grippers 4 are rotatably mounted on pins 8 in small bearings 10, 11 which are mounted on the links of the chain and are pressed by springs 9 wound round the bolts 8 against the tables or supports 7 likewise mounted on the links 12. Fig. 4 shows the opening and closing of the grippers. The gripper 4 moves in the direction of the arrow onto the circular disk 3. In this embodiment this disk 3 can rotate with the sprocket-wheel or more rapidly than the same. In the latter case the curve 13 of the shoulder or projection 5 of each gripper will be so shaped that at the moment of its coacting with the disk 3 the point of contact D (Fig. 5) is located below the line E—F which passes through the centers of rotation of the disk and the gripper. In consequence of the turning moment which is exercised in this manner on the gripper the latter is opened, as shown in Fig. 4, and the potato will drop. The gripper continues to move in its open position and arrives into the potato holder, whereupon the spring 9 (Fig. 2) slowly closes it because the part 13 of the gripper moves away from the periphery of the disk 3. A potato is held and carried along by the gripper in this manner. Under certain circumstances two or three potatoes may be seized. This is, however, a rare case which can occur only when the two potatoes are approximately of equal size and when they enter the gripper simultaneously. The superfluous potatoes fall out of the gripper when passing the sorting wheel 2 (Fig. 6) as will now be explained.

Before running onto the sorting wheel the upper side of the chain constitutes a rectilinear track for the grippers 4 and the small tables or supports 7. When on the sorting wheel the position of a table relatively to its gripper changes as the distance of the center F (Fig. 7) from the table 7 which is constant when the chain is rectilinear becomes greater, as shown in Fig. 8. On leaving the sorting wheel the same condition obtains as before running onto it. This movement of the gripper relatively to the table illustrated in Figs. 7 and 8 causes the potato to be rolled between the gripper and table. Owing to this rolling inequalities in the potatoes at once make themselves felt and that potato, whose transverse dimensions diminish when rolled, drops down. For aiding this operation the table 7 may be arranged slantwise, as Fig. 9 shows. See also the table 7' shown in dotted lines in Fig. 3, in which case the table has a recess in order to allow the chain to pass.

In the modification shown in Fig. 10 the chain is omitted. The grippers are opened by a special steering wheel 15. The latter is mounted on a separate axle eccentrically to the sprocket-wheel inside the rim of the same and rotates in the same direction as the larger sprocket-wheel 14, but at a considerably greater speed. The grippers arrive closed at the wheel 15 and open for a short time each time the projection 5 is pulled toward the front by the friction of the wheel 15.

If desired, in all the above-described forms of my invention both the sprocket-wheels for the conveyer chain and also the sprocket-wheel and steering wheel according to Fig. 10 may be mounted slantwise or horizontally for the purpose of providing that any superfluous potatoes which are pushed in front of the gripper and might be sometimes driven over the conveying wheel are at once thrown off, in consequence of the slanting or horizontal position of the chain or wheel, and do not arrive over the descending half of the wheel but can drop through the opening intended for the passage of the grippers into the furrow.

I claim:—

1. In feed and conveyer mechanism for distributing bodies of various sizes, the combination with an endless conveying member and two wheels carrying the same, of tables carried by said member, a spring-influenced gripper rotatably mounted on said member in operative relation to each table, the gripper and the table being connected to relatively movable portions of the conveying member whereby each gripper when passing one of the wheels is caused to move relatively to its table and thereby impart a rolling movement to a body pressed by it on the table.

2. In feed and conveyer mechanism for distributing bodies of various sizes, the combination with an endless conveying member and two wheels carrying the same, of tables carried by said member, a spring-influenced gripper rotatably mounted on said member in operative relation to each table, the gripper and the table being connected to relatively movable portions of the conveying member whereby each gripper when passing one of the wheels is caused to move relatively to its table and thereby impart a rolling movement to a body pressed by it on the table, each table slanting relatively to the conveying member.

3. In feed and conveyer mechanism for distributing bodies of various sizes, the combination with an endless chain and two sprocket-wheels carrying the same, of gripping devices each comprising a spring-influenced rotatable gripper and a support carried by the chain, each gripper having a shoulder, and a disk mounted eccentrically to one of the sprocket wheels for contacting with the shoulders of the grippers and opening the grippers.

In testimony whereof I affix my signature in presence of two witnesses.

BOHUMIL JIROTKA.

Witnesses:
HUGH GRAMATFKI,
ELSA HUUPT.

Copies of this patent may be obtained for five cents each, by addressing the "Commissioner of Patents, Washington, D. C."